(12) United States Patent
Lu et al.

(10) Patent No.: US 12,531,394 B2
(45) Date of Patent: Jan. 20, 2026

(54) TOPOLOGICAL PHOTONIC CRYSTAL CAVITY AND ITS APPLICATION IN LASERS

(71) Applicant: Institute of Physics, Chinese Academy of Sciences, Beijing (CN)

(72) Inventors: Ling Lu, Beijing (CN); Lechen Yang, Beijing (CN); Xiaomei Gao, Beijing (CN)

(73) Assignee: Institute of Physics, Chinese Academy of Sciences, Beijing (CN)

( * ) Notice: Subject to any disclaimer, the term of this patent is extended or adjusted under 35 U.S.C. 154(b) by 533 days.

(21) Appl. No.: 17/755,246

(22) PCT Filed: Oct. 28, 2019

(86) PCT No.: PCT/CN2019/113621
§ 371 (c)(1),
(2) Date: Apr. 25, 2022

(87) PCT Pub. No.: WO2021/081697
PCT Pub. Date: May 6, 2021

(65) Prior Publication Data
US 2022/0385038 A1 Dec. 1, 2022

(51) Int. Cl.
*H01S 5/185* (2021.01)
*G02B 6/122* (2006.01)
*H01S 5/11* (2021.01)

(52) U.S. Cl.
CPC ............ *H01S 5/185* (2021.01); *G02B 6/1225* (2013.01); *H01S 5/11* (2021.01)

(58) Field of Classification Search
CPC . H01S 5/185; H01S 5/11; H01S 5/183; G02B 6/1225
See application file for complete search history.

(56) References Cited

U.S. PATENT DOCUMENTS

| | | | |
|---|---|---|---|
| 11,283,244 B2 * | 3/2022 | Segev | H01S 5/041 |
| 2008/0080579 A1 | 4/2008 | Scherer | |

(Continued)

FOREIGN PATENT DOCUMENTS

| | | |
|---|---|---|
| CN | 101267089 | 9/2008 |
| CN | 102332674 | 1/2012 |

(Continued)

OTHER PUBLICATIONS

International Search Report issued in International Application No. PCT/CN2019/113621, mailed on Jun. 30, 2020.

(Continued)

*Primary Examiner* — Jay C Kim
*Assistant Examiner* — Woo K Lee
(74) *Attorney, Agent, or Firm* — Knobbe Martens Olson & Bear LLP

(57) ABSTRACT

A two-dimensional topological photonic crystal cavity, a design method thereof and an application in a laser. The two-dimensional topological photonic crystal cavity comprises multiple photonic crystal supercells, the multiple photonic crystal supercells having vortex-shaped structural variation around a center of the two-dimensional topological photonic crystal cavity, and bands of the multiple photonic crystal supercells having Dirac points at balance positions of the vortex-shaped structural variation. The two-dimensional topological photonic crystal cavity, also called the Dirac vortex cavity, is characterized by having large mode field area, large free spectral range, narrow beam divergence angle, arbitrary mode degeneracy and compatibility with plurality of types of substrate material, and may be used in a surface-emitting semiconductor laser, enabling stable single-transverse-mode and single-longitudinal-mode operation, while ensuring broad-area and high-power output of a laser.

16 Claims, 10 Drawing Sheets

(56) References Cited

U.S. PATENT DOCUMENTS

| | | | |
|---|---|---|---|
| 2013/0279850 A1 | 10/2013 | Bravo-Abad et al. | |
| 2014/0064310 A1* | 3/2014 | Chua | H01S 5/11 372/45.01 |
| 2016/0036201 A1* | 2/2016 | Takiguchi | H01S 5/2018 372/45.01 |
| 2016/0261093 A1 | 9/2016 | Noda et al. | |
| 2019/0018301 A1 | 1/2019 | Kolis et al. | |

FOREIGN PATENT DOCUMENTS

| | | |
|---|---|---|
| CN | 106353853 | 1/2017 |
| CN | 106353853 A | 1/2017 |
| CN | 105191029 | 1/2018 |
| CN | 108028511 | 5/2018 |
| CN | 108459370 A | 8/2018 |
| CN | 110007398 | 7/2019 |
| CN | 110727047 | 1/2020 |
| CN | 216529834 U | 5/2022 |
| EP | 2 330 699 A1 | 6/2011 |
| JP | 2010-056446 A | 3/2010 |
| JP | 2015-523726 A | 8/2015 |
| JP | 2016-156971 A | 9/2016 |
| WO | WO 2013/191745 A1 | 12/2013 |
| WO | WO 2018/185749 A1 | 10/2018 |

OTHER PUBLICATIONS

Search Report issued in Chinese Patent Application No. 2019110353799.

Written Opinion issued in International Application No. PCT/CN2019/113621, mailed on Jun. 30, 2020.

Office Action issued in Japanese Patent Application No. 2022-524599, mailed on Jul. 4, 2023 in 8 pages.

Extended European Search Report in European Patent Application No. 19950767.4 mailed on Aug. 17, 2023 in 11 pages.

He et al., "The Emergence of Dirac points in Photonic Crystals with Mirror Symmetry", Scientific Report, vol. 5, No. 8186, published on Feb. 2, 2015 in 7 pages.

Gao et al., "Dirac-vortex topological cavity", Physics Optics, Nov. 21, 2019 in 7 pages.

* cited by examiner

| | Symmetry | $H(k)$ | $\sigma_x k_x \tau_z$ | $\sigma_z k_y \tau_z$ | $m_1 \tau_x$ | $m_2 \tau_y$ | $m_0 \sigma_y \tau_z$ |
|---|---|---|---|---|---|---|---|
| [H,Sym.]=0 | Time Inversion | $\mathcal{T} = \tau_x K\|_{k\to -k}$ | ✓ | ✓ | ✓ | ✓ | ✓ |
| | Parity/Spatial Inversion | $\mathcal{P} = \tau_x\|_{k\to -k}$ | ✓ | ✓ | ✓ | × | × |
| | Spatial-Time Inversion | $\mathcal{PT} = K$ | ✓ | ✓ | ✓ | × | × |
| {H,Sym.}=0 | Particle-hole/charge conjugation | $\mathcal{C} = \sigma_y \tau_y K\|_{k\to -k}$ | ✓ | ✓ | ✓ | ✓ | × |
| | Chiral | $\mathcal{S} = \mathcal{TC} = \sigma_y \tau_z$ | ✓ | ✓ | ✓ | ✓ | × |

FIG. 1

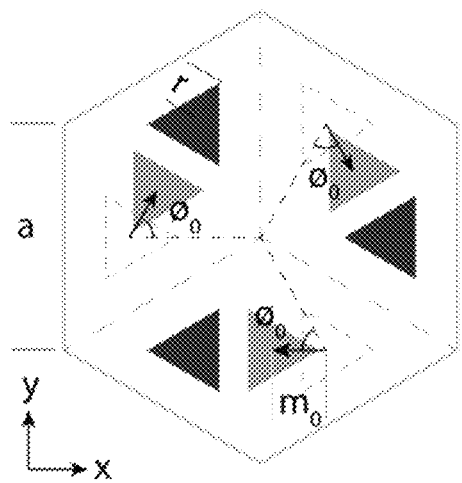

a Supercell

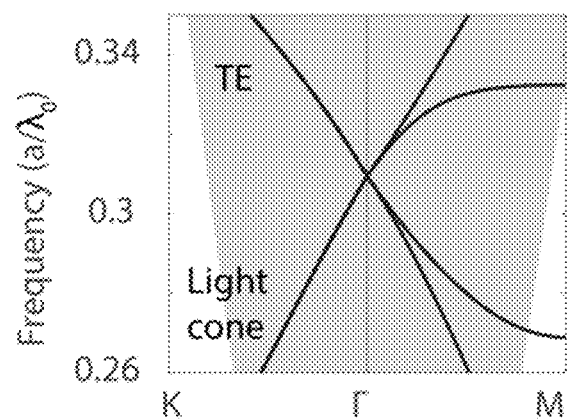

b Double Dirac cones ($m_0$=0)

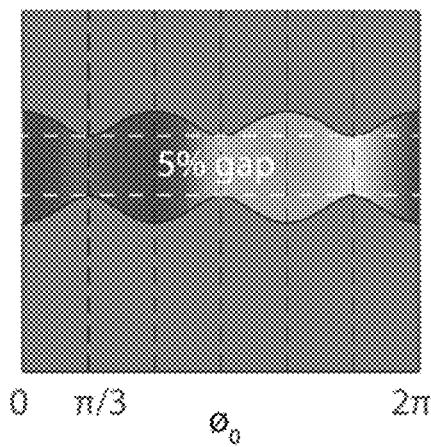

c $2\pi$ mass gap ($m_0$=0.1a)

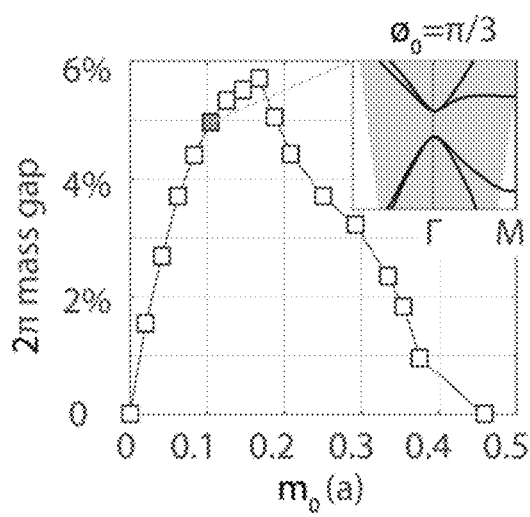

d Gap size

FIG. 2

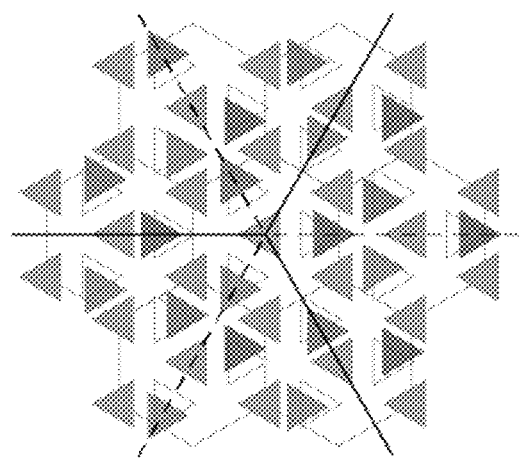
a  $w = 3n+1 = -2, +1, +4$
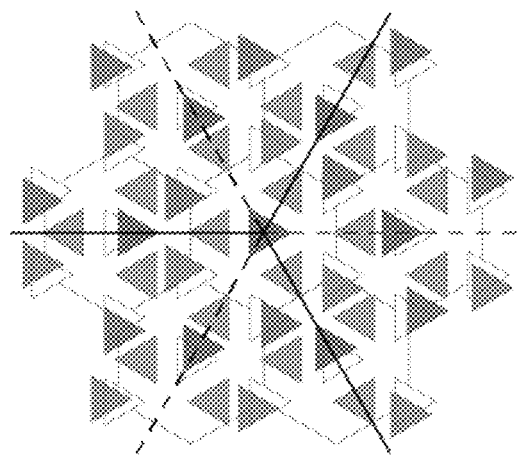
b  $w = 3n+2 = -1, +2, +5$
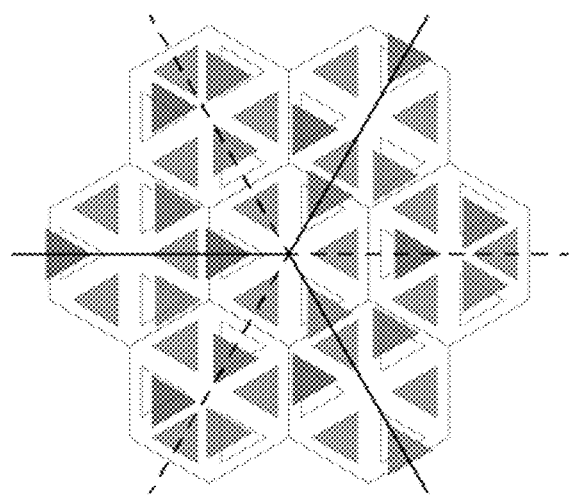
c  $w = 3n+3 = -3, 0, +3$
FIG. 4

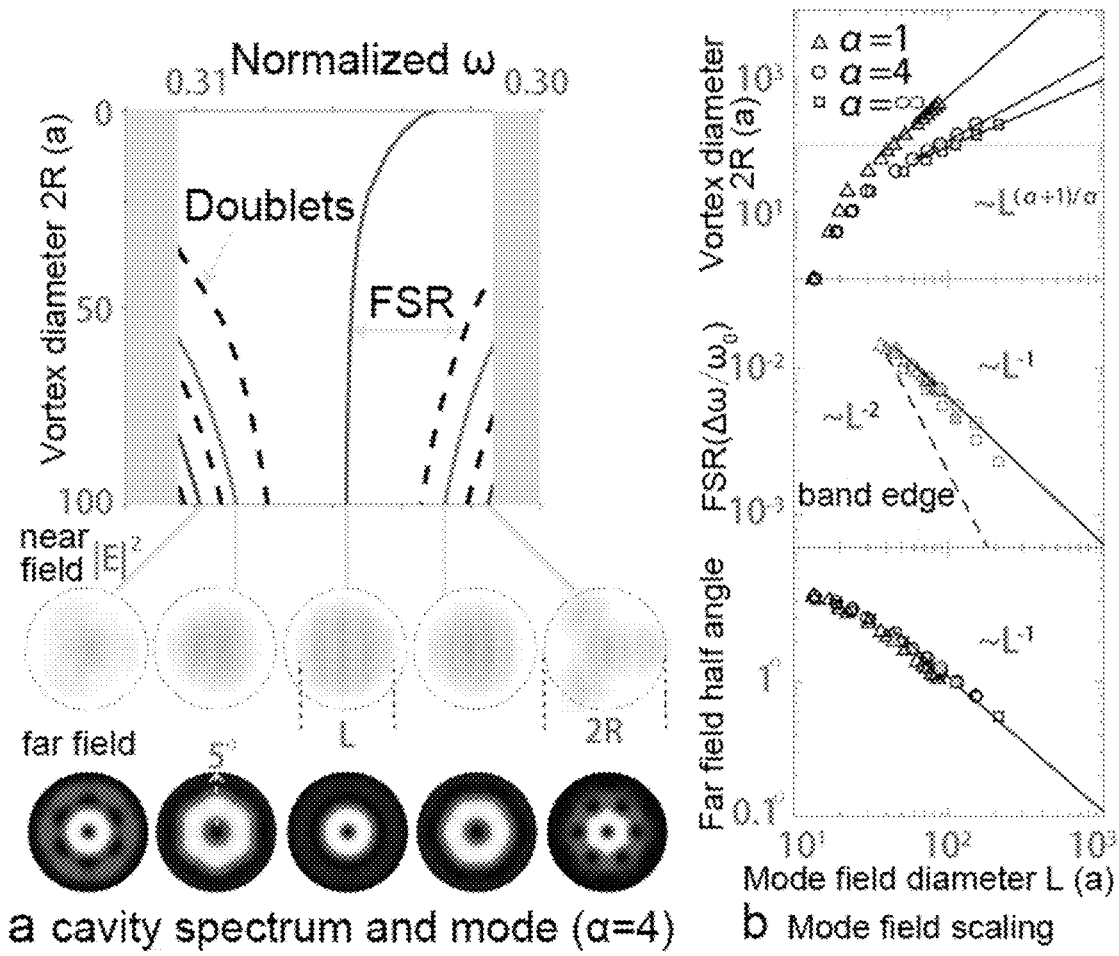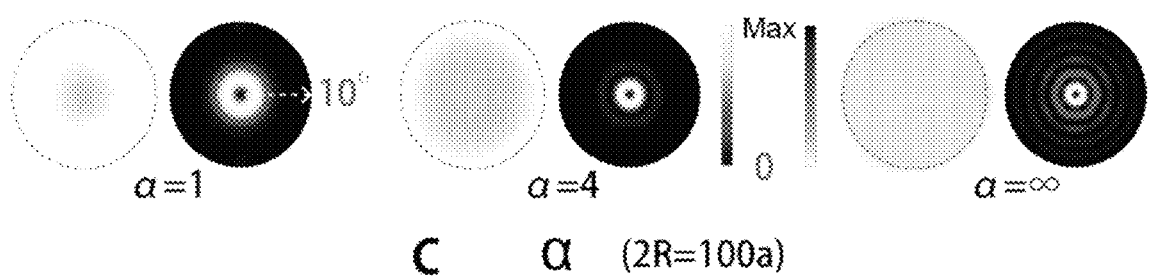
FIG. 6

TOPOLOGICAL PHOTONIC CRYSTAL CAVITY AND ITS APPLICATION IN LASERS

TECHNICAL FIELD OF THE DISCLOSURE

The present disclosure relates to the technical field of a two-dimensional topological photonic crystal cavity, and more specifically, to a two-dimensional topological photonic crystal cavity, a design method thereof, and an application in a laser.

BACKGROUND

Semiconductor lasers have advantages of high efficiency, a long life, a small size, a wide wavelength range, easy integration and modulation capability, etc., and are widely used in fields such as optical communications, optical processing, medical treatment, and military. However, the traditional semiconductor laser has a wide gain spectrum, many modes, a large divergence angle, and low power for a single device.

Single-mode semiconductor lasers are the standard light sources in the fields of optical communication, spectroscopy, metrology and sensing. The uniform one-dimensional Bragg grating distributed feedback laser (DFB) is widely used in long-distance fiber networks due to its advantages such as narrow linewidth and stable wavelength. However, as it has two competitive band-edge modes, a quarter-wavelength phase shift needs to be introduced in the cavity design in order to realize that a stable mid-gap mode operates at the Bragg wavelength. A vertical cavity surface emitting laser (VCSEL) also uses the same one-dimensional defect mode to select a single longitudinal mode output, and it is widely used in applications such as near field communication, mouse, laser printer and face recognition.

The two-dimensional photonic crystal surface emitting lasers developed in recent years have a plurality of advantages over one-dimensional designs, such as a larger area, high power and a low beam divergence angle. However, the periodically structured two-dimensional photonic crystal surface emitting laser also has competitive outputs of at least two band-edge modes with high quality factors. Therefore, there is an urgent requirement to design a single-mode two-dimensional photonic crystal cavity, especially a two-dimensional cavity for a robust mid-gap single mode, which has always been an absence for the two-dimensional distributed feedback laser since it was proposed, for a single stable laser mode usually means that the laser has a higher output, a wider tuning range, a narrower linewidth and a high power.

SUMMARY

In order to meet at least one aspect of the above requirement, the present disclosure provides a two-dimensional topological photonic crystal cavity, a design method thereof and an application in a laser.

In a first aspect of the present disclosure, there is provided a two-dimensional topological photonic crystal cavity. The two-dimensional topological photonic crystal cavity comprises a plurality of photonic crystal supercells. The plurality of photonic crystal supercells have a vortex-shaped structural variation around a cavity center of the two-dimensional topological photonic crystal cavity, and band structures of the plurality of photonic crystal supercells have Dirac points at balance positions of the vortex-shaped structural variation.

According to an embodiment of the present disclosure, the plurality of photonic crystal supercells having the vortex-shaped structural variation around the cavity center of the two-dimensional topological photonic crystal cavity comprises one or more types of sublattices in the plurality of photonic crystal supercells being moved and rotated coordinatively relative to their respective balance positions, wherein continuous phase rotation from 0 to $2\pi$ of the moved sublattices can break the Dirac points in the band structures when the photonic crystal supercells are at the balance positions.

According to an embodiment of the present application, one or more types of sublattices in the plurality of photonic crystal supercells being moved and rotated coordinatively relative to their respective balance positions specifically comprises the cavity center of the two-dimensional topological photonic crystal cavity being at an arbitrary spatial point, and the plurality of photonic crystal supercells having the vortex-shaped structural variation, according to their respective distances and angles relative to the cavity center, in a variation form that one or more types of sublattices in the photonic crystal supercells move displacement vectors relative to their respective balance positions, wherein amplitude and phase of the displacement vector both are functions of positions of the sublattices relative to the cavity center, the phase of the displacement vectors for respective sublattices has a fixed phase difference, the amplitude of the displacement vectors varies from zero to a maximum amplitude along a radial direction of the cavity, and the phase of the displacement vectors varies continuously or discretely along an angular direction of the cavity with an increment per circle around the cavity center of an integer multiple of $2\pi$, where this integer, being positive or negative, is a winding number.

According to an embodiment of the present disclosure, parameters of the vortex-shaped structural variation comprise one or more in a group consisting of a spatial distribution function of the displacement vector, the winding number, the maximum amplitude, size and shape of the cavity, a cavity center position, a material refractive index, a material fill factor, size of the supercell and size of a primitive cell, a working wavelength and frequency of the cavity, shape of the supercell, a number of Dirac points in the band structure of the supercell and a position of Dirac points in a Brillouin zone when the supercell is at the balance position, a number and shape of the primitive cells in the supercell, a number and shape of the sublattices in the primitive cell, and a truncation form of the photonic crystal at an edge of the cavity.

According to an embodiment of the present disclosure, the polygonal supercell is a hexagonal supercell composed of three quadrilateral primitive cells, and each quadrilateral primitive cell comprises two sublattices; when the supercell is at the balance position, a honeycomb lattice is formed and two Dirac points at the edge of the Brillouin zone in the band structure of the primitive cell are folded to a center of the Brillouin zone of the supercell to form a double Dirac point; and in the vortex-shaped structural variation, three sublattices of the same type in the supercell are rotate to have a phase difference of 120 degrees and a winding number of positive or negative one.

In another aspect of the present disclosure, there is provided a design method of a two-dimensional topological photonic crystal cavity. The design method comprises performing a vortex-shaped spatial position modulation on a plurality of photonic crystal supercells around a cavity center of the two-dimensional topological photonic crystal cavity, wherein band structures of the plurality of photonic crystal supercells have Dirac points at a balance position of the vortex-shaped spatial position modulation.

According to an embodiment of the present disclosure, the step of performing the vortex-shaped spatial position modulation on the plurality of photonic crystal supercells around the cavity center of the two-dimensional topological photonic crystal cavity comprises performing coordinated movement and rotation on one or more types of sublattices in the plurality of photonic crystal supercells relative to their respective balance positions, wherein continuous rotations from 0 to $2\pi$ of the phase of the moved sublattices all can break the Dirac points in the band structure when the photonic crystal supercells are at the balance positions.

According to an embodiment of the present disclosure, the step of performing coordinated movement and rotation on one or more types of sublattices in the plurality of photonic crystal supercells relative to their respective balance positions specifically comprises: selecting an arbitrary point as the cavity center of the two-dimensional topological photonic crystal cavity, and performing the vortex-shaped spatial position modulation on the photonic crystal supercells, according to their respective distances and angles relative to the cavity center, in a form that one or more types of sublattices in the plurality of photonic crystal supercells move displacement vectors from their respective balance positions, wherein amplitude and phase of the displacement vectors are functions of positions of the sublattices relative to the cavity center, the phase of the displacement vectors for respective sublattices has a fixed phase difference, the amplitude of the displacement vectors varies from zero to a maximum amplitude along a radial direction of the cavity, and the phase of the displacement vectors varies continuously or discretely along an angular direction of the cavity with an increment per circle around the cavity center of an integer multiple of $2\pi$ where the integer, being positive or negative, is a winding number.

In another aspect of the present disclosure, there is provided a two-dimensional topological photonic crystal cavity, wherein the two-dimensional topological photonic crystal cavity comprises a plurality of layers of materials with different refractive indexes, and any one or more layers of the plurality of layers of materials with different refractive indexes adopt the above-mentioned two-dimensional topological photonic crystal cavity, or any one or more layers of the plurality of layers of materials with different refractive indexes adopt the two-dimensional topological photonic crystal cavity obtained by using the above-mentioned design method.

According to an embodiment of the present disclosure, the materials with different refractive indexes are semiconductor materials, organic light-emitting materials, air, gases, metals, or insulators, the semiconductor materials comprise any one-elementary or compound material in a III-V group, II-VI group, or IV group, and the any one-elementary or compound material in the III-V group, II-VI group or IV group comprises one or more selected from a group consisting of Si, Ge, GaN, GaP, GaAs, InGaP, InGaAs, AlGaAs, AlGaN, GaAsP, InAs, InAlGaN, In Sb, InP, or InGaAsP.

In another aspect of the present disclosure, there is further provided a laser having the above-mentioned two-dimensional topological photonic crystal cavity, or a two-dimensional topological photonic crystal cavity obtained by using the above-mentioned design method.

According to embodiments of the present disclosure, the two-dimensional topological photonic crystal cavity provided by the present disclosure is a novel integrable optical cavity with independently controllable mode number, mode field area, radiation coupling and far-field radiation, which are superior to other type of cavities. This two-dimensional topological photonic crystal cavity is an upgrade, towards a two-dimensional feedback structure, of phase shift distribution feedback and vertical cavity surface emitting lasers. It provides a single mid-gap mode with a large mode field diameter which is continuously adjustable from a few microns to a few millimeters in size.

The two-dimensional topological photonic crystal cavity provided by the present disclosure can be compatible with the semiconductor material platform of the current photonic crystal surface emitting laser. The surface emitting laser prepared using this cavity will have the following advantages: 1. It can provide unique single-mode laser emission; 2. It has a larger free spectral range; 3. In the current photonic crystal surface emitting lasers, the hexagonal lattice produces more coherent in-plane feedback than the square lattice does. In fact, in order to reduce the number of band-edge modes and suppress multimode laser, the square lattices are preferred over the hexagonal lattices, which, however, will no longer be a problem for two-dimensional topological photonic crystal cavities; 4. The cavity design and the above advantages are of topological robustness to processing errors; 5. The application of the two-dimensional topological photonic crystal cavity in the photonic crystal surface emitting laser products can improve working stability, repeatability and laser brightness, and can achieve a laser output with high power, narrow linewidth and wide tuning range.

The two-dimensional topological photonic crystal cavity provided by the present disclosure has the characteristics such as a large mode field area, a large free spectral range, a narrow beam divergence angle, arbitrary mode degeneracy and compatibility with a plurality of substrate materials, and can be applied to surface emitting lasers, ensuring that the laser can still work stably in single transverse mode and single longitudinal mode during output of a large area and high energy.

The two-dimensional topological photonic crystal cavity provided by the present disclosure can work at any wavelength and frequency in respect of radio, microwave, terahertz, infrared, visible, and ultraviolet bands by varying structural dimensions.

BRIEF DESCRIPTION OF THE DRAWINGS

The above and other objects, features and advantages of the present disclosure will become more apparent from the following description of embodiments of the present disclosure with reference to the accompanying drawings. In the accompanying drawings:

FIG. 1 schematically shows a symmetry analysis of four-band two-dimensional Bosonic Dirac Hamiltonian according to an embodiment of the present disclosure, wherein the chirality is protective symmetry;

FIGS. 2a-2d schematically show a structural design for a two-dimensional topological photonic crystal cavity according to an embodiment of the present disclosure;

FIGS. 4a-4c schematically show schematic diagrams of three choices for a cavity center of a two-dimensional topological photonic crystal cavity according to an embodiment of the present disclosure;

FIGS. 6a-6c show a variation rule of characteristics of a two-dimensional topological photonic crystal cavity over vortex sizes by a two-dimensional simulation calculation analysis according to an embodiment of the present disclosure, wherein a shows distribution characteristics of cavity spectrum and mode field; b shows proportional relation characteristics of a mode field diameter to a vortex diameter, a free spectral range (FSR), and a far-field half-angle; and c shows near-field and far-field characteristics when $\alpha$ is different;

FIG. 11a is a schematic structural diagram of a laser with a two-dimensional topological photonic crystal cavity according to an embodiment of the present disclosure; and FIG. 11b is a cross-sectional view of the laser shown in FIG. 11a.

DETAILED DESCRIPTION

Figure 3:
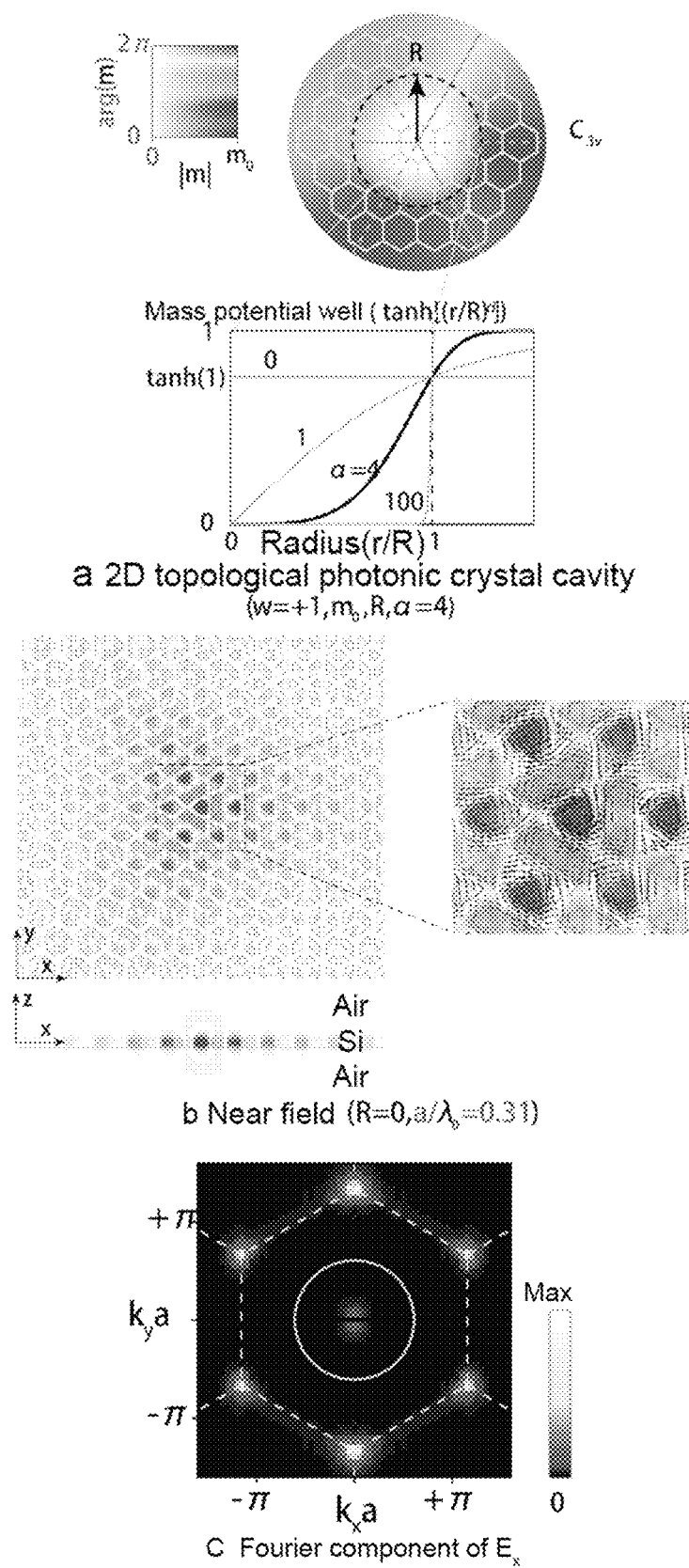
FIGS. 3a-3c schematically show three-dimensional calculation results of an air-clad silicon structure for a two-dimensional topological photonic crystal cavity according to an embodiment of the present disclosure.

Hereinafter, embodiments of the present disclosure will be described with reference to the drawings. However, it should be understood that these descriptions are only exemplary, and are not intended to limit the scope of the present disclosure. In the following detailed description, for ease of explanation, many specific details are set forth to provide a comprehensive understanding of embodiments of the present disclosure. However, it is obvious that one or more embodiments can also be implemented without these specific details. In addition, in the following description, descriptions of well-known structures and technologies are omitted to avoid unnecessarily obscuring the concept of the present disclosure.

The terms used herein are only for describing specific embodiments rather than intended to limit the present disclosure. The terms "comprise", "include", "containing" and "having" used herein indicate the existence of the described features, steps, operations and/or components, but do not exclude the presence or the addition of one or more other features, steps, operations or components.

Unless otherwise defined, all terms (comprising technical and scientific terms) used herein have meanings commonly understood by those skilled in the art. It should be noted that the terms used herein should be interpreted as having meanings consistent with the context of this specification, and should not be interpreted in an idealized or overly rigid manner.

Embodiments of the present disclosure provide a two-dimensional topological photonic crystal cavity, its design method, and its application in a laser. Now firstly the realization principle of the two-dimensional topological photonic crystal cavity is introduced.

Distributed feedback (DFB) and vertical cavity surface emitting lasers (VCSEL) are the dominant semiconductor lasers in application fields, and the two types of optical cavities have a single mid-gap mode with one-dimensional lattice topology defects. The present disclosure uses a honeycomb photonic crystal with Dirac vortex mass-similar to the Jackiw-Rossi zero mode, and extends the design of topological cavity to two dimensions to obtain a two-dimensional topological photonic crystal cavity. This two-dimensional topological photonic crystal cavity, also called a Dirac vortex cavity, has the characteristics such as a scalable mode area, a large free spectral range, a narrow beam divergence angle, an arbitrary mode degeneracy and compatibility with a plurality of substrate materials, and it can be used in surface emitting semiconductor lasers to ensure that the lasers can still work stably in an absolute single mode (single transverse mode and single longitudinal mode) during output of a large area and high energy. The present disclosure predicts theoretically and proves experimentally that the two-dimensional topological photonic crystal cavity has a mode field area tunable in respect of several orders of magnitude, arbitrary mode degeneracy, a large free spectral range for a robust, and a low divergent vector beam output and being compatibility with high refractive index substrates. This kind of topological cavity allows the photonic crystal surface emitting laser (PCSEL) to still work stably in a single transverse mode and single longitudinal mode under a large area and high-power output condition.

In order to design a two-dimensional mid-gap defect cavity, the present disclosure firstly recognizes that the mid-gap modes of the phase shift distributed feedback and vertical cavity surface emitting lasers are actually topological, which are mathematically equivalent to the one-dimensional Jackiw-Rebbi zero mode and Su-Schrieffer-Heeger (SSH) edge state. This topological concept leads us to the two-dimensional Jackiw-Rossi zero-mode, and the design of a two-dimensional topological photonic crystal cavity which uses a continuous supercell library with a mass band gap $\phi_0$ covering the entire $2\pi$ range, realizing the Dirac photonic crystal with a vortex mass. The silicon-on-insulator (SOI) was used in the experiment to prepare a two-dimensional topological photonic crystal cavity, also called the Dirac vortex cavity.

Massless Dirac fermions in condensed matter are a class of quasi-particles whose energy and momentum are in a linear relationship and whose conduction band and valence band are degenerate in energy at a certain point in the momentum space. The Dirac point of a massless Dirac fermion in a solid, namely the energy degeneracy point of the conduction band and the valence band, is usually protected by symmetry.

The mid-gap mode of the Dirac vortex cavity is a zero-mode solution of the two-dimensional Dirac formula with vortex mass in the photon domain, and the Dirac Hamilton in the following formula 1 contains five anti-transaction terms, where $\sigma_i$ and $T_i$ represent Pauli matrices. In two dimensions, the first two items are the mass-independent Dirac Hamiltonian, being four-by-four, and the latter three terms are the mass terms which are time-reversed invariants. For a detailed symmetry analysis, please refer to FIG. 1.

$$H(k)=(\sigma_x k_x+\sigma_z k_y)T_z+m_1 T_x+m_2 T_y+m'\sigma_y T_z \quad \text{(Formula 1)}$$

When m' is 0, the symmetry protection is a chiral symmetry $S=\sigma_y T_z$ ($SHS^{-1}=-H$), and the remaining two mass terms form a complex number $[m=m_1+jm_2]$ which can be wound $\omega$ times in the plane, namely $m(r)\propto\exp[j\omega\arg(r)]$, where r is a space coordinate, $j^2=-1$, and $\omega$ is a winding number of Dirac mass, and the magnitude and sign of $\omega$ determine the number and chirality of the mid-gap modes.

In a real photonic system with a finite frequency, S has a slight symmetry breaking, and m' is not completely zero, resulting in that the Dirac spectrum is not completely up and down symmetrical, and the $\omega$ topological modes are not strictly degenerate in frequency.

In this disclosure, a two-dimensional photonic crystal Jackiw-Rossi mid-gap mode with a wavelength of 1.55 μm is designed on a silicon film with a thickness of 220 nm (0.46a). The air-clad silicon structure is firstly designed, and then the case of a dielectric substrate is evaluated. In order to improve the computational efficiency, all models are up and down symmetric (Z-mirror), so the mode fields can be classified according to the mirror symmetry.

FIGS. 2a-2d schematically show the structural designs of a two-dimensional topological photonic crystal cavity according to an embodiment of the present disclosure. FIG. 2a shows a hexagonal honeycomb supercell perturbed by generalized Kekulé modulation, wherein r=0.32a, where a is a lattice constant of the two-dimensional topological photonic crystal cavity, and r is a circumscribed circle radius of a primitive cell triangle in a supercell. FIG. 2b shows band structures of double Dirac cones of an undisturbed supercell. FIG. 2c shows a case that the band structure is broken when $\phi_0$ is an angle within a range from 0 to $2\pi$. FIG. 2d shows a variation condition of the band-gap size over $m_0$, and the inset is a case that the double Dirac point band is broken when $\phi_0=\pi/3$.

FIG. 2a shows a hexagonal supercell constituting a two-dimensional topological photonic crystal cavity according to an embodiment of the present disclosure, wherein the supercell is composed of three quadrilateral primitive cells, and the black and gray filled parts are the sublattices of the primitive cell. In the present disclosure, a silicon thin film material is preferred, and the sublattice is preferably a triangular air hole structure. In the supercell, the Dirac points originally located at the boundary of the Brillouin zone (±K points below the light cone) are folded to the Dirac points at the center of the Brillouin zone (the F point above the light cone), thus forming a double Dirac point. FIG. 2b is a double Dirac point band diagram according to an embodiment of the present disclosure. The black and gray sublattices represent an air pore structure of the silicon film. Compared with the circular structure, the air pores with a triangular structure can improve the frequency independence of the Dirac points. The present disclosure applies the generalized Kekulé modulation in the supercell to generate $2\pi$ vortex mass and break the double Dirac point band structure.

The three gray sublattices of the supercell in FIG. 2a have moved the same amplitude $m_0$ and the corresponding phase $\phi_0$ from the respective balance positions. In the cavity structure designed in the present disclosure, for non-zero $m_0$ and any value of the phase $\phi_0$ within a range of $[0, 2\pi]$, the band gap is always open, and the band gap is closed at the center of the vortex when $m_0=0$. FIG. 2c shows the calculation results of mass band gap according to an embodiment of the present disclosure. Due to the symmetry of the supercell, the mass band gap in FIG. 2c has an angular period of $\pi/3$, and the band gap is the smallest when $\phi_0=\pi/3$. FIG. 2d shows the variation condition of the band gap size over $m_0$ according to an embodiment of the present disclosure, wherein the maximum value of this $2\pi$ mass band gap is 6%, and as $m_0$ increases, the band gap will eventually close, and wherein the inset part shows the case that the double Dirac points band is broken when $\phi_0=\pi/3$. In Formula 1, the modulation vector $m=m_0 e^{j\phi_0}$ has the same physical meaning as the mixed Dirac mass $m=m_1+jm_2$, so the same symbol is used in this disclosure.

FIG. 3a shows an illustration of a two-dimensional topological photonic crystal cavity and a mass potential well function. FIG. 3b shows a near field ($H_z$) of the topological mode with $m_0=0.1a$, wherein the quality factor Q=317, the mode volume V=4.0 $(\lambda_0/n)^3$, and the far field half angle is 4.3°, and wherein the enlarged figure of the central area is the electric field distribution. FIG. 3c shows a Fourier component of the electric field $E_x$.

FIG. 3a is a schematic diagram of the structural design of a two-dimensional topological photonic crystal cavity according to an embodiment of the present disclosure. The cavity design of the present disclosure adopts a continuous supercell library with a mass band gap $\phi_0$ covering the entire $2\pi$ range. In this cavity design, an arbitrary point is selected as the cavity center of a two-dimensional topological photonic crystal cavity, and the plurality of photonic crystal supercells have a vortex-shaped structural variation, according to their respective distances and angles relative to the cavity center, in a variation form that one or more types of sublattices in the photonic crystal supercell move displacement vectors m relative to their respective balance positions, wherein the amplitude of the displacement vector |m| and the phase $\phi=\text{Arg}(m)$ both are functions of positions of the sublattices relative to the cavity center, the phase of the displacement vectors for respective sublattices has a fixed phase difference, the amplitude of the displacement vectors varies from zero to a maximum amplitude $m_0$ along a radial direction of the cavity, and the phase of the displacement vectors varies continuously or discretely along an angular direction of the cavity with an increment per circle around the cavity center of an integer multiple of $2\pi$, where this integer, being positive or negative, is a winding number, thus forming a two-dimensional topological photonic crystal cavity, also known as a Dirac vortex cavity.

In the mid-gap mode of the two-dimensional topological photonic crystal cavity of the present disclosure, the in-plane electric field thereof is spatial vortex, which is well proved by the calculation results of FIG. 3b, and the Fourier component of the electric field ($E_x$) of FIG. 3c reveals its momentum distribution relative to the light cone.

The design of the cavity vortex mass $m(r-r_0)$ has a great degree of freedom. The present disclosure applies formula 2 to express it, which can be determined by four parameters $(\omega, m_0, R, \alpha)$. The mass potential well functions $\tanh(x)$ $|_{x\to+\infty}=+1$ and $\tanh(x^\alpha)|_{x\to 0}=x^\alpha$ show an explanation from the center zero mass $|m(r=r_0)|=0$ to the boundary maximum mass $|m(r\gg r_0)|=m_0$.

$$m(r-r_0; \omega, m_0, R, \alpha) = m_0\tanh\left(\left|\frac{r-r_0}{R}\right|^\alpha\right)e^{j[\phi_0-\omega\arg(r-r_0)]} \quad \text{(Formula 2)}$$

In Formula 2, the first parameter $\omega$ is the winding number of the vortex, and it is a positive or negative integer. The value of $|\omega|$ determines the number of mid-gap modes, and the mode field area generally increases as $|\omega|$ increases. Whether $\omega$ is positive and negative represents the chirality of the mode field, determining the distribution condition of the mode field in the sublattices. The topological mode of the two-dimensional topological photonic crystal cavities populates only in one sublattice of the primitive cell of the cavity. When the sign of $\omega$ is changed, it will populate in another sublattice. In FIG. 3b, the peak values of the magnetic field ($H_z$) and electric field ($E_{x,y}$) are in the triangles pointing to the left, which provides a lot of freedoms for the design and preparation of the cavity.

The second parameter $m_0$ is the maximum Dirac mass, and it represents the depth of the mass potential well in FIG. 3a. In FIG. 2a, $m_0$ represents the maximum amplitude of movement of the sublattice in the cavity (the corresponding phase is $\phi_0$), and it also is the radiation coupling strength when the double Dirac points couples into the light cone, so the quality factor Q of the cavity decreases as $m_0$ increases. ($r-r_0$) is a position vector of each sublattice in the two-dimensional topological photonic crystal cavity supercell relative to the coordinate $r_0$, and the maximum Dirac mass $m_0$ is obtained when ($r\gg r_0$).

The third parameter R is a vortex radius of the two-dimensional topological photonic crystal cavity, and its value can be $R\geq 0$. The mode field size is not zero when the vortex size R=0. In such case, there is an envelope layer on the periphery of the vortex in order to ensure sufficient mode field confinement, and an envelope layer of 50 periods outside the vortex is preferred in the present disclosure.

The fourth parameter $\alpha$ is a shape factor-a positive exponent that controls the shape of the potential well, and it can range from 0 to $+\infty$. $\alpha$ also controls the envelope and radiation pattern of the near field of the cavity modes. The size of the cavity mode field does not necessarily increase rapidly like the vortex size and it also depends on the value of $\alpha$.

The shape factor $\alpha$ controls the size characteristics of the two-dimensional topological photonic crystal cavity. In order to balance these characteristics, $\alpha=4$ is preferred in the embodiments of the present disclosure. When the cavity parameter $\omega$ is set to be +1 or −1, a single topology mode can be realized, and in the present disclosure, $\omega=+1$ is optional. In order to obtain a large free spectral range (FSR), a large mass band gap $m_0=0.1a$ may be selected in the present disclosure.

The cavity center of the two-dimensional topological photonic crystal cavity of the present disclosure can be at any spatial point. The present disclosure shows three different conditions of the cavity center, which indicate the cavity center is located at any one sublattice and vertices of the primitive cells, respectively, and correspond to a, b, and c in FIG. 4, respectively. Here, a, b, and c in FIG. 4 schematically show the schematic diagrams of three choices of the cavity center of the two-dimensional topological photonic crystal cavity according to an embodiment of the present disclosure, and the three choices all provide the cavity with $C_{3v}$ symmetry. Since the cavity has $C_{6v}$ symmetry when the sublattice is in the balance position ($m_0=0$), if a $\omega$-related symmetric vortex center is selected, the cavity ($m_0\neq 0$) of the present disclosure can always maintain $C_{3v}$ symmetry.

Based on the above-mentioned contents, one embodiment of the present disclosure provides a two-dimensional topological photonic crystal cavity which comprises a plurality of photonic crystal super cells, wherein the plurality of photonic crystal supercells have a vortex-shaped structural variation surrounding the cavity center of the two-dimensional topological photonic crystal cavity, and the band structures of the plurality of photonic crystal supercells have Dirac points at the balance position of the vortex-shaped structural variation.

The plurality of photonic crystal supercells having the vortex-shaped structural variation surrounding the cavity center of the two-dimensional topological photonic crystal cavity comprises the coordinated movement and rotation of one or more types of sublattices in the plurality of photonic crystal supercells relative to their respective balance positions, wherein the continuous phase rotations of from 0 to $2\pi$ of the moved sublattices can break the Dirac points in the band structures of the photonic crystal supercells when the photonic crystal supercells are at the balance positions.

The coordinated movement and rotation of one or more types of sublattices in the plurality of photonic crystal supercells relative to their respective balance positions specifically comprise the cavity center of a two-dimensional topological photonic crystal cavity being at an arbitrary spatial point and the plurality of photonic crystal supercells having a vortex-shaped structural variation, according to their respective distances and angles relative to the cavity center, in a variation form that one or more types of sublattices in the photonic crystal supercell move displacement vectors relative to their respective balance positions, wherein amplitude and phase of the displacement vectors both are functions of positions of the sublattice relative to the cavity center with the phase of each sublattice displacement vector having a fixed phase difference, wherein the amplitude of the displacement vectors varies from zero to a maximum amplitude along the radial direction of the cavity, and the phase of the displacement vectors varies continuously or discretely along an angular direction of the cavity with an increment per circle around the cavity center of an integer multiple of $2\pi$, where this integer, regardless of positive or negative, is a winding number. As such, a two-dimensional topological photonic crystal cavity, also called a Dirac vortex cavity, is formed.

The photonic crystal supercell has a double Dirac point, and is modulated by using a generalized Kekulé modulation. The generalized Kekulé modulation comprises the coordinated rotation and movement of one type or all of sublattices, resulting in $2\pi$ Dirac mass and breaking the double Dirac point band. The parameters modulated by this generalized Kekulé modulation comprise one or more in a group consisting of a spatial distribution function of the displacement vector, the winding number, the maximum amplitude, the size and shape of the cavity, the cavity center position, a material refractive index, a material fill factor, sizes of the supercell and the primitive cell, a working wavelength and frequency of the cavity, a shape of the supercell, the number of Dirac points in the band structures of the supercell and the position of Dirac points in the Brillouin zone when the supercell is at the balance positions, the number and shape of the primitive cell in the supercell, the number and shape of the sublattice in the primitive cell, and a truncation form of the photonic crystal at an edge of the cavity.

The photonic crystal supercell is a polygonal supercell with a planar close-packed structure, and the shape of the polygonal supercell is in a shape such as triangle, quadrilateral, pentagon, hexagon, heptagon, octagon, and so on. When the polygonal supercell is a hexagonal supercell, the hexagonal supercell is composed of three quadrilateral primitive cells, and each quadrilateral primitive cell comprises two sublattices; when the supercell is at the balance position, a honeycomb lattice is formed, and two Dirac points at the edge of the Brillouin zone in the band structures of the primitive cell are folded into the center of the supercell Brillouin zone, forming a double Dirac point. The vortex-shaped structural variation comprises a rotation of one sublattice in the primitive cell around its balance position, while three sublattices of the same type in the supercell are rotated to have a phase difference of 120 degrees with respect to each other, and continuous phase rotations from 0 to $2\pi$ all can break the double Dirac point in the band structures of the supercell when the supercell is at the balance position. The cavity center of the two-dimensional topological photonic crystal cavity can be an arbitrary point, and the sublattice can have a circle, a triangle, or any other regular or irregular shapes and patterns.

Another embodiment of the present disclosure also provides a design method of a two-dimensional topological photonic crystal cavity. The method comprises performing a vortex-shaped spatial position modulation on a plurality of photonic crystal supercells surrounding the cavity center of the two-dimensional topological photonic crystal cavity, wherein band structures of the plurality of photonic crystal supercell have Dirac points at the balance position of the vortex-shaped spatial position modulation.

In the design method of the two-dimensional topological photonic crystal cavity, the vortex-shaped spatial position modulation on the plurality of photonic crystal supercells surrounding the cavity center of the two-dimensional topological photonic crystal cavity is coordinated movement and rotation on one or more types of sublattices in the plurality of photonic crystal supercells relative to their respective balance positions, wherein the continuous phase rotations from 0 to $2\pi$ for the moved sublattices all can break the Dirac points in the band structures when the photonic crystal supercell is at the balance position.

In the design method of the two-dimensional topological photonic crystal cavity, the step of performing the coordinated movement and rotation on one or more types of sublattices in the plurality of photonic crystal supercells relative to their respective balance positions specifically comprises selecting an arbitrary point as the cavity center of the two-dimensional topological photonic crystal cavity, and performing the vortex-shaped spatial position modulation on the photonic crystal supercells, according to their respective distances and angles relative to the cavity center, in a form that one or more types of sublattices in the photonic crystal supercells move displacement vectors relative to their respective balance positions, wherein amplitude and phase of the displacement vectors are functions of positions of the sublattice relative to the cavity center with the phase of the displacement vector for each sublattice having a fixed phase difference, wherein the amplitude of the displacement vectors varies from zero to a maximum amplitude along a radial direction of the cavity, and the phase of the displacement vector varies continuously or discretely along an angular direction of the cavity with an increment per circle around the cavity center of an integer multiple of $2\pi$, where this arbitrary positive or negative integer is a winding number, thus forming a two-dimensional topological photonic crystal cavity, also called a Dirac vortex cavity.

Another embodiment of the present disclosure also provides a two-dimensional topological photonic crystal cavity prepared by using the above-mentioned design method for a two-dimensional topological photonic crystal cavity. The prepared two-dimensional topological photonic crystal cavity comprises a plurality of layers of materials, wherein the materials respectively have different refractive indexes, and any one or more layers of the plurality of layers of materials having different refractive indexes adopt the above-mentioned two-dimensional topological photonic crystal cavity, or any one or more layers of the plurality of layers of materials having different refractive indexes adopt the two-dimensional topological photonic crystal cavity obtained by using the above-mentioned design method.

Figure 5:
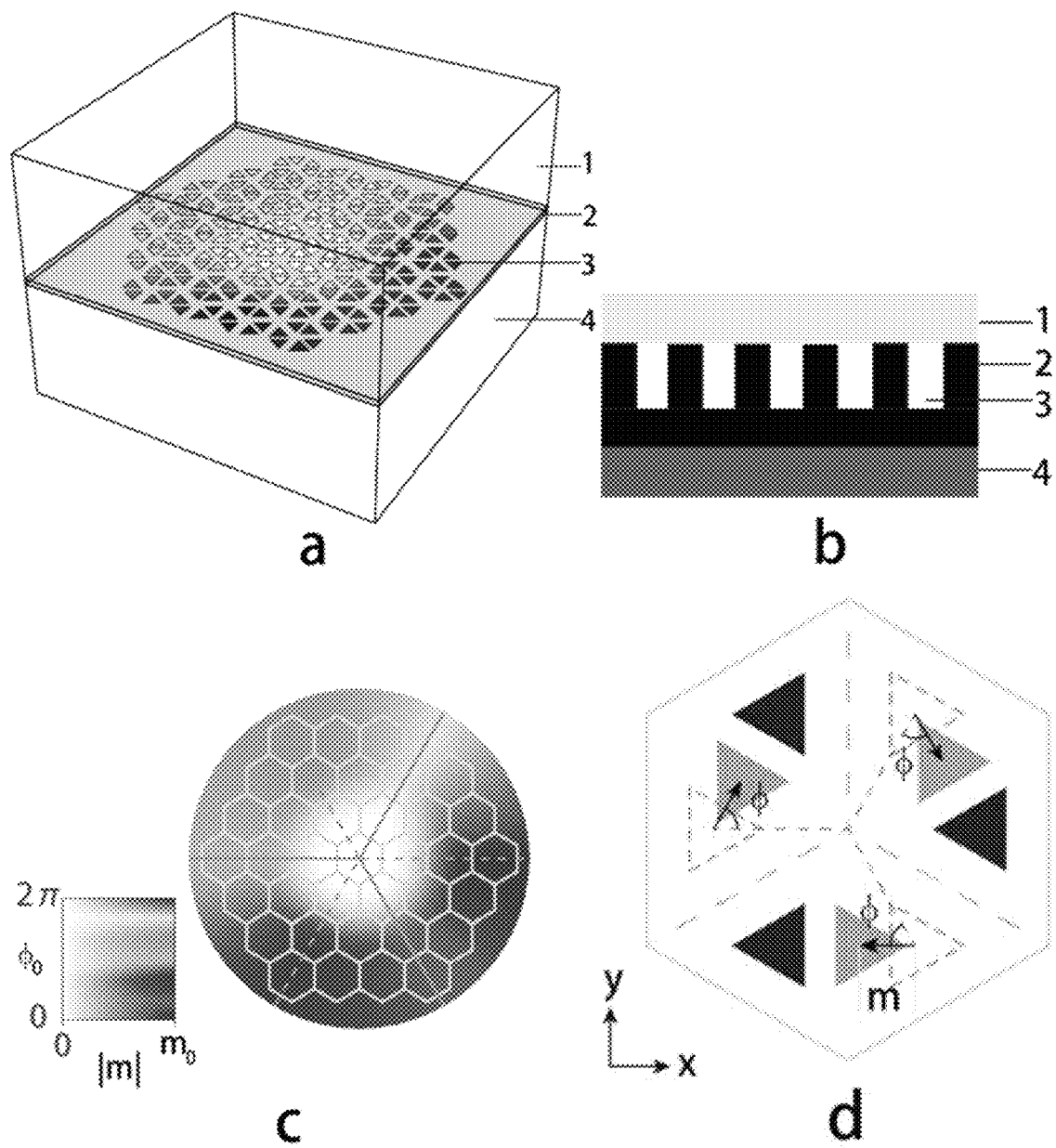
FIG. 5a is a schematic structural diagram of a two-dimensional topological photonic crystal cavity according to an embodiment of the present disclosure.
FIG. 5b is a cross-sectional view of a two-dimensional topological photonic crystal cavity according to an embodiment of the present disclosure.
FIG. 5c is a schematic diagram of a planar structure for a two-dimensional topological photonic crystal cavity according to an embodiment of the present disclosure.
FIG. 5d is a schematic diagram of a hexagonal supercell structure in the two-dimensional topological photonic crystal cavity shown in FIG. 5c.

FIG. 5a is a schematic structural diagram of a two-dimensional topological photonic crystal cavity according to an embodiment of the present disclosure. As shown in FIG. 5a, the two-dimensional topological photonic crystal cavity comprises a plurality of layers of materials with different refractive indexes, wherein any one or more layers of the plurality of layers of materials with different refractive indexes are prepared by using the above-mentioned design method for a two-dimensional topological photonic crystal cavity. In the embodiment shown in FIG. 5a, the two-dimensional topological photonic crystal cavity is a sandwich structure composed of a first material 1, a second material 2, a third material 3, and a fourth material 4, wherein the second material 2 and the third material 3 are nested inside each other in the middle layer, and the first material 1 and the fourth material 4 are respectively located on the upper and lower sides of the middle layer. The first material 1, the second material 2, the third material 3, and the fourth material 4 adopt materials having different refractive indexes, such as semiconductor materials, organic materials, air, gases, metals or insulators, which are used in composition and support of the two-dimensional topological photonic crystal cavity. The semiconductor material may comprise any one-elementary or compound material in the III-V group, II-VI group or IV group, such as one or more selected from the group consisting of Si, Ge, GaN, GaP, GaAs, InGaP, InGaAs, AlGaAs, AlGaN, GaAsP, InAs, InAlGaN, InSb, InP, or InGaAsP.

In one embodiment of the present disclosure, the second material 2 and the third material 3 are located in the same layer, namely the middle layer of the sandwich structure; the second material 2 can adopt a semiconductor material, and the third material 3 can adopt air, namely voids are formed by etching the second material 2, as shown in FIG. 5b; and when the second material 2 adopts a semiconductor material, and the third material 3 can also adopt a dielectric material with a refractive index different from that of the second material 2, that is, the voids shown in FIG. 5b are filled with a semiconductor material with a refractive index different from that of the second material 2.

In the above embodiment, the second material 2 adopts a semiconductor material and the third material 3 adopts air, or the second material 2 and the third material 3 adopt semiconductor materials with different refractive indexes. In this case, the first material 1 and the fourth material 4 respectively located on the upper and lower sides of the middle layer can both adopt semiconductor materials and can both adopt air, or one of the first material 1 and the fourth material 4 adopts a semiconductor material while the other adopts air.

In the above embodiment, when the second material 2 is etched to form voids, the depths of the voids do not exceed the thickness of the second material 2. In practical applications, the depths of the voids may exceed the thickness of the second material 2 and it can extend into the first material 1 or the fourth material 4.

In another embodiment of the present disclosure, the second material 2 may adopt air and the third material 3 may adopt a semiconductor material, under which condition, the first material 1 and the fourth material 4 respectively located on the upper and lower sides of the middle layer both can adopt a semiconductor material/semiconductor materials at the same time, or one of the first material 1 and the fourth material 4 adopts a semiconductor material while the other one adopts air.

The two-dimensional topological photonic cavity provided in this disclosure has characteristics such as scalable mode areas, large free spectral ranges (FSR), narrow beam divergence angles, arbitrary mode degenerations, and being compatible with a variety of substrate materials, which are necessary for a high-power single mode laser. These advantages can be well applied to surface emitting lasers to ensure that the lasers can still operate stably in single transverse mode and single longitudinal mode during output of a large area and high energy output.

FIG. 5c is a schematic diagram of the planar structure of a two-dimensional topological photonic crystal cavity according to an embodiment of the present disclosure. The planar structure of the two-dimensional topological photonic crystal cavity is composed of a plurality of hexagonal supercells, and an arbitrary point is selected as the cavity center of the two-dimensional topological photonic crystal cavity. The vortex-shaped spatial modulation is performed on the photonic crystal supercells, according to their respective distances and angles relative to the cavity center, in a modulation form that one or more types of sublattices in the photonic crystal supercells move displacement vectors m from their respective balance positions, wherein the amplitude |m| and the phase $\phi$=Arg (m) of the displacement vectors are all functions of positions of the sublattices relative to the cavity center, the phase of the displacement vectors for each sublattice has a fixed phase difference, the amplitude of the displacement vectors varies from zero to a maximum amplitude $m_0$ along a radial direction of the cavity, and the phase of the displacement vectors varies continuously or discretely along an angular direction of the cavity with an increment per circle around the cavity center of an integer multiple of $2\pi$, where this arbitrary positive or negative integer is a winding number, thus forming a two-dimensional topological photonic crystal cavity, also called a Dirac vortex cavity.

FIG. 5d is a schematic diagram of a hexagonal supercell structure which is composed of three quadrilateral primary cells. Each of the quadrilateral primary cells comprises 2 sublattices, one (filled with light gray in the figure) of which moves an amplitude m and a corresponding phase $\phi$ from the individual balance position. The sublattice is formed by filling a different dielectric material (comprising air) in the second material 2, and the shape of the sublattice may be circular, triangular, or any other regular or irregular shape and pattern, but is not limited to these structures.

Figure 7:
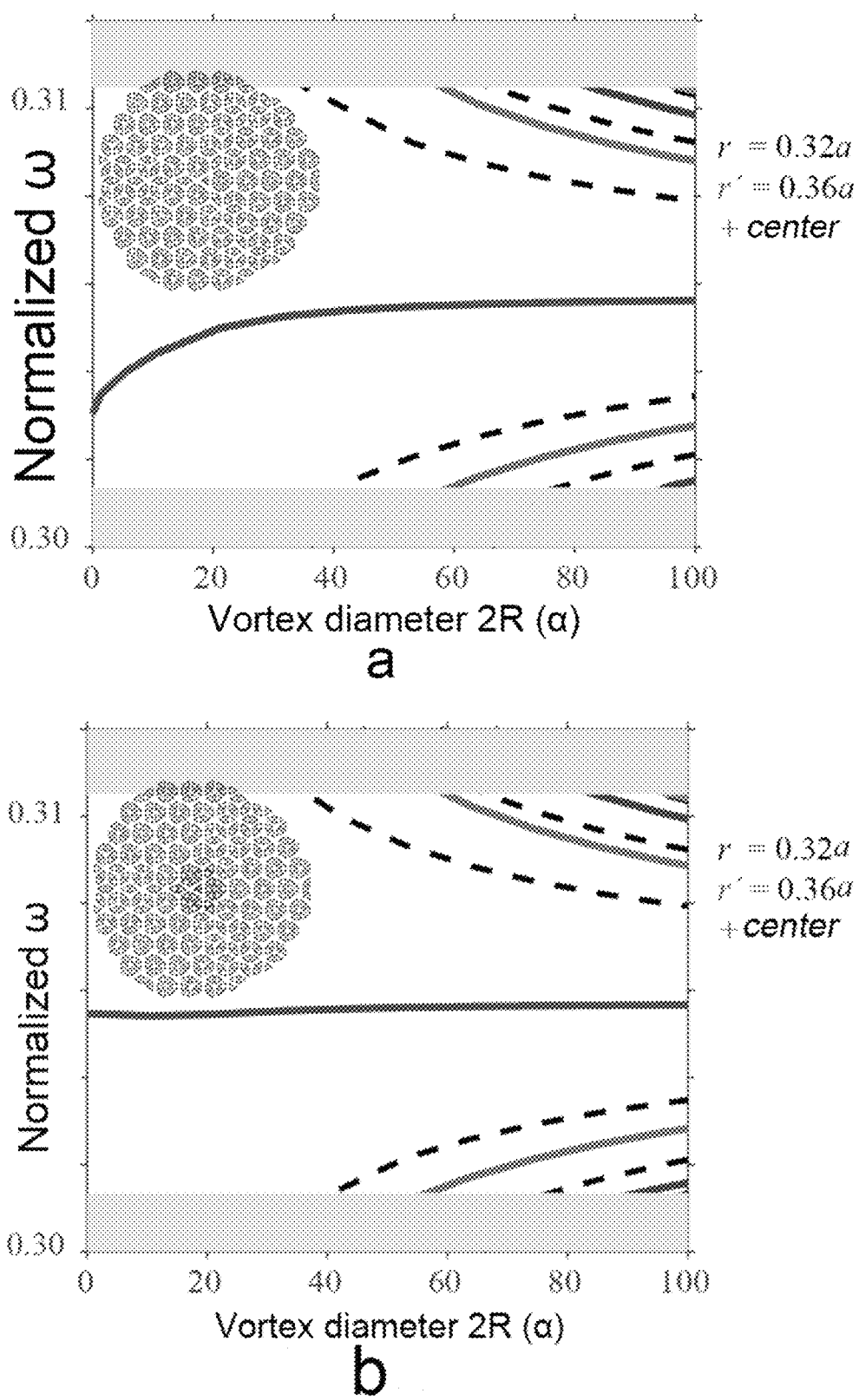
FIGS. 7a-7b are schematic diagrams of the invariance of cavity mode frequency according to an embodiment of the present disclosure.
Figure 8:
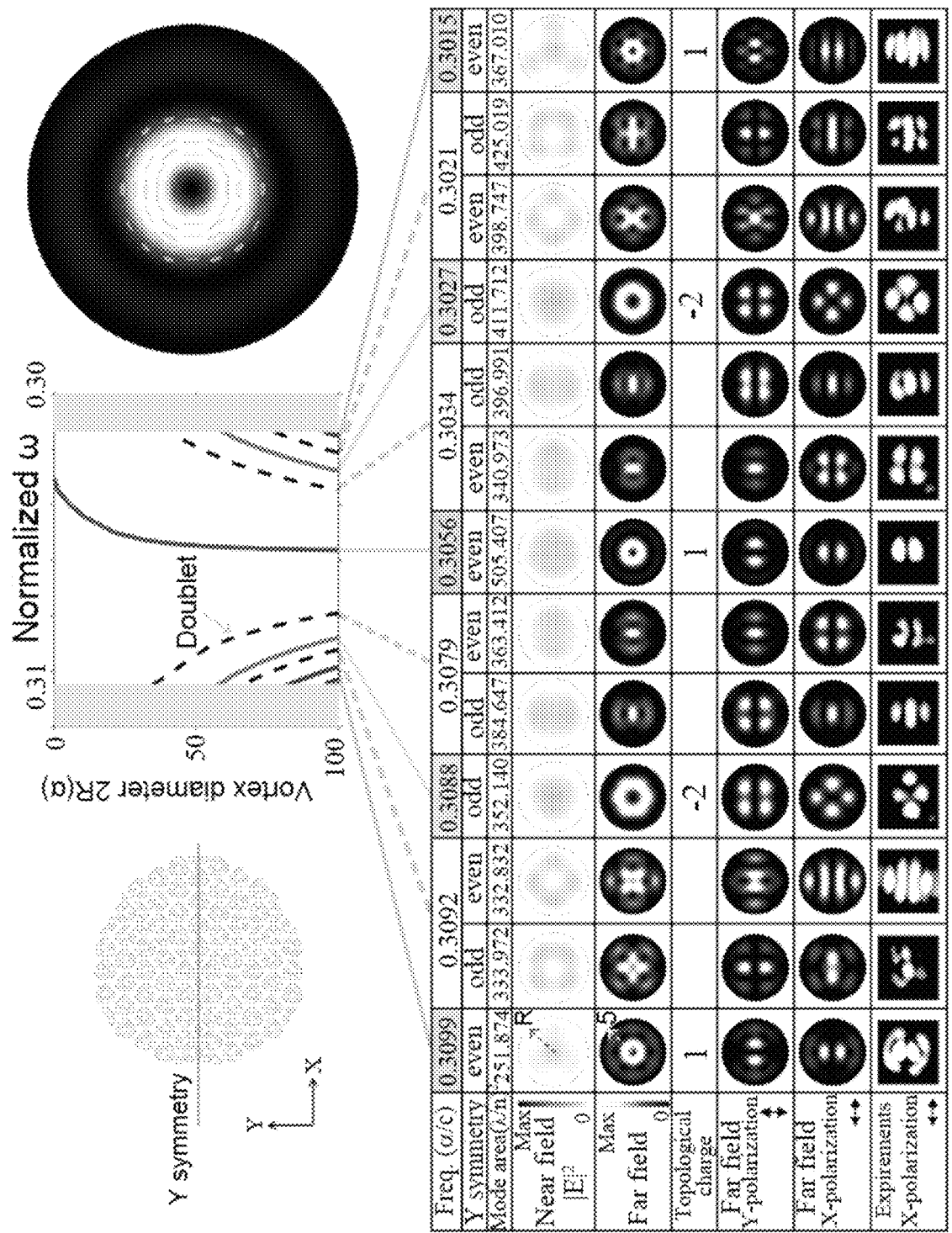
FIG. 8 shows detailed information of the modal properties of all cavity modes according to an embodiment of the present disclosure.

The two-dimensional topological photonic structure of the present disclosure has a large design degree of freedom, and can have a constant frequency for all vortex sizes by adjusting the size of the air hole in the cavity center, which is best proved by calculation results in FIG. 7. As shown in FIG. 7a, due to lack of chiral symmetry, the topological mode of the cavity in a smaller size generally does not appear in the middle of the band gap; the frequency for the topological mode of the cavity in a larger size is always converged to a Dirac point frequency for at this time the cavity center zone is close to an unmodulated Dirac lattice(s) and thus corresponds to the original Dirac spectrum. By adjusting the size of the sublattice in the cavity, the topological mode of the cavity in a smaller size can also be adjusted to the center of the band gap; as shown in FIG. 7b, by increasing the sizes of the sublattices in the center region, the frequencies for the topological mode of the cavities are all converged to the Dirac point frequency. As R increases, these high-order non-topological cavity modes will be derived from bulk modes located above or below the band gap. Since the structure has the $C_{3v}$ symmetry, the high-order modes have doublets and singlet modes. FIG. 6a is the near-field and far-field maps for single mode of a two-dimensional topological photonic crystal cavity. Detailed information for All of the mode fields is listed in FIG. 8, in which the right inset shows a topologically molded polarization state with 2R=100a and these topological modes have the largest and most uniform mode field zone and the smallest far-field divergence, which are exactly required by the current laser cavity.

The diameter (L) of the mode field of the two-dimensional topological photonic crystal cavity increases with the increase of the vortex diameter (2R), and the diameter L for large mold fields is proportional to $$R^{\frac{\alpha}{\alpha+1}},$$

which is proved by calculation results from FIG. 6b; and the wave function $\psi_0$ (r) of zero mode depends on the radial integral of the mass function:

$$|\Psi_0(r)| \propto e^{-\int_0^r |m(r')|dr'} \propto e^{-\int_0^r (r'/R)^\alpha dr'} \propto e^{-\frac{r^{\alpha+1}}{R^\alpha}},$$

which is in conformity with the mass definition in Formula 2. For limited $\alpha$, the size of topological mode fields increases sub-linearly as R increases, and it is an ideal linear increase ratio at $\alpha=\infty$.

The two-dimensional topological photonic crystal cavity of the present disclosure has a robust and large free spectral range (FSR), as shown in FIG. 6a, which is essential for the single mode operation. The free spectrum range of linear Dirac band-edge ($\propto L^{-1}$) is much larger than the free spectrum range of the quadratic band-edge ($\propto L^{-2}$) and when it is in a large mode, this advantage is very obvious. The two-dimensional topological photonic crystal cavity of the present disclosure has the same $L^{-1}$ advantage relative to a large free spectral range (FSR), and this scaling ratio is topologically robust for the disturbance of any systematic parameters. The calculation results from FIG. 6b excellently proved these characteristics of the two-dimensional topological photonic crystal cavity of the present disclosure. For a large mode, the mode field diameter L is proportional to $$R^{\frac{\alpha}{\alpha+1}},$$

the sizes of free spectral ranges are proportional to $L^{-1}$ and the far-field angle is proportional to $L^{-1}$.

The far-field for single mode of the two-dimensional topological photonic crystal cavity of the present disclosure is a vector light beam, and the far-field is obtained by integrating the near-field using the Rayleigh-Sommerfeld diffraction theory. In a large mode field, the beam angle is inversely proportional to the mode field diameter. In the present disclosure, a far-field half angle will be less than 1° when the vortex diameter exceeds 200a, which can be well applied to the preparation of the narrow light beam laser.

Figure 9:
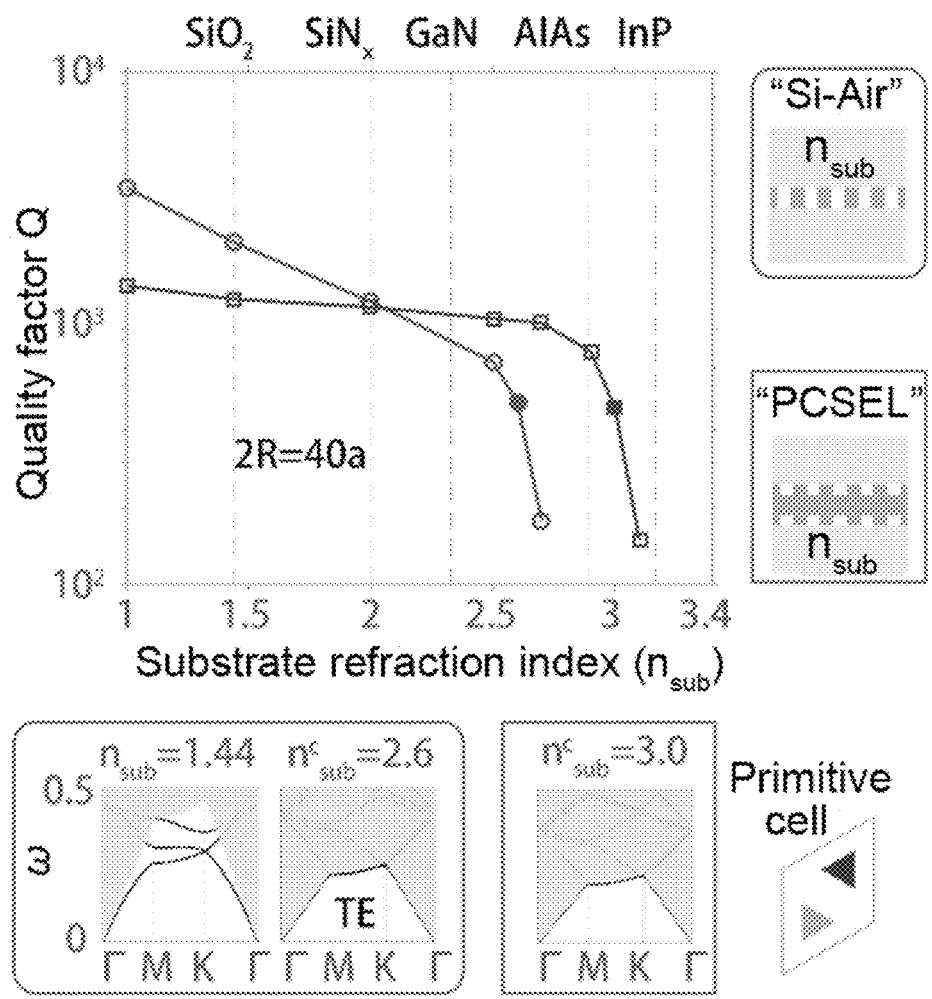
FIG. 9 is a schematic diagram of variation rule of cavity quality factor Q over refractive indexes of substrate according to an embodiment of the present disclosure.

As a practical device, the two-dimensional topological photonic crystal cavity of the present disclosure can operate on various substrates such as ones for heat dissipation, electric conduction and mechanical support. In FIG. 9, the two-dimensional topological photonic crystal cavities are placed on homogeneous substrates, and the relationship between the Quality Factor Q and the substrate refractive index ($n_{sub}$) for two different core waveguide structures, Silicon-Air (Si-Air) and Photonic Crystal Surface Emitting Lasers (PCSEL), is calculated, while the quality factor Q value of the cavity can still increase as the vortex size increases.

In the Silicon-Air (Si-Air) structure, a silicon film is placed on the substrate, and the value of quality factor Q of the cavity gradually decreases with the increase of $n_{sub}$ (based on the power law), and when reaching the critical refractive index $n_{sub}^c=2.6$, the value of the quality factor Q will decrease exponentially (the circle-point line in FIG. 9), and at this time, the value of $n_{sub}^c$ has covered the common substrate materials such as silica, sapphire and gallium nitride. For $n_{sub}^c=3$, it is compatible with the GaAs/AlGaAs material system currently used in photonic crystal surface emitting lasers (PCSEL) (the square-line in FIG. 9), which also fully demonstrates the application potential of the two-dimensional topological photonic crystal cavity of the present disclosure in the surface emitting lasers.

In order to verify the characteristics such as the spectral and the mode field for the two-dimensional topological photonic crystal cavity in the present disclosure, by applying the methods of electron beam lithography and dry etching, the photonic crystal cavity is prepared on the silicon (SOI) film of the insulating substrate. The silica on the bottom layer of the photonic crystal cavity is used to provide mechanical stability. In experiments of this embodiment, it is preferred that $\alpha=4$ and the lattice constant is 490 nm.

Figure 10:
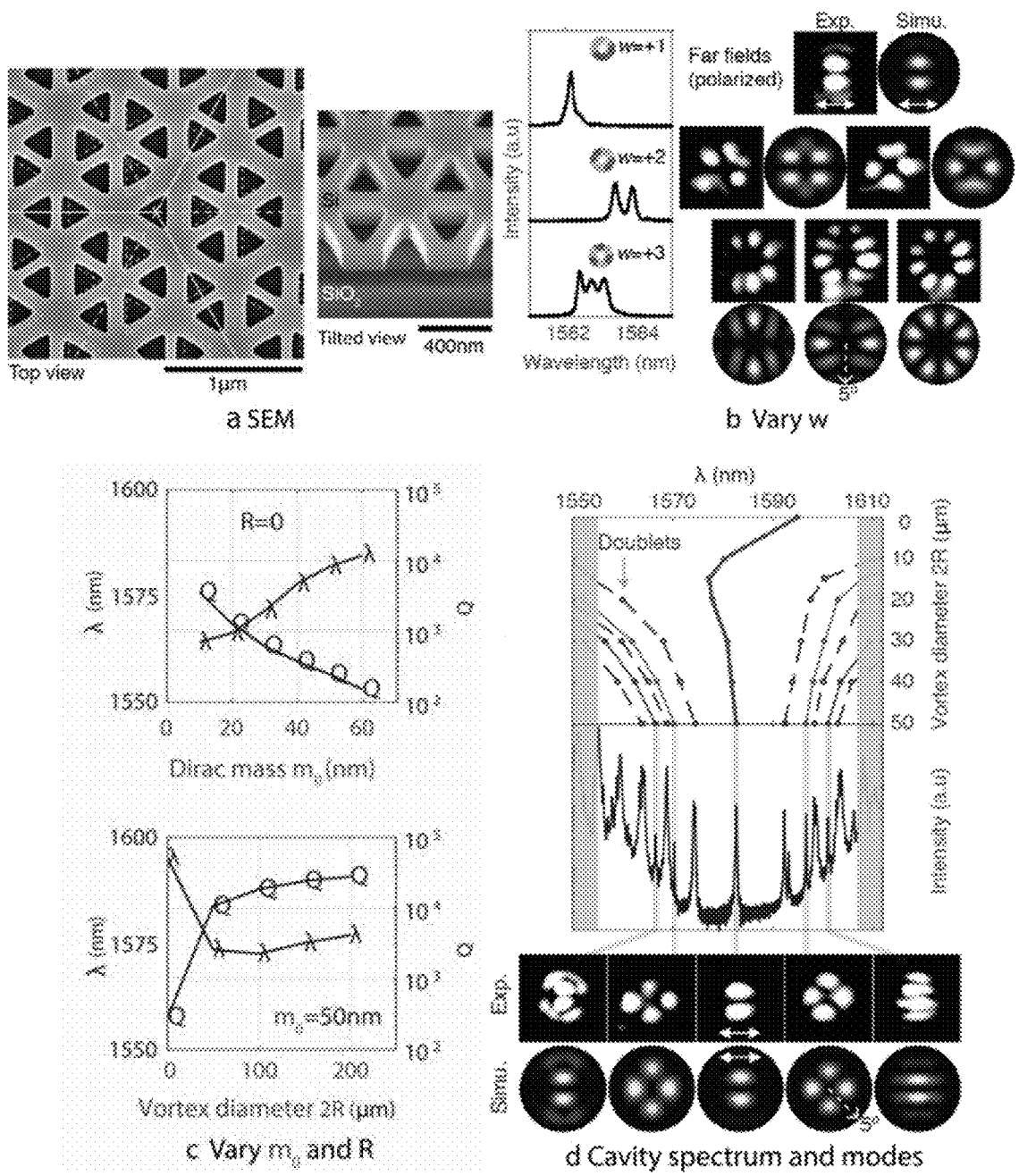
FIG. 10a-10b show experimental analysis results of a two-dimensional topological photonic crystal cavity, when $\alpha=4$, according to an embodiment of the present disclosure, wherein 10a shows scanning electron microscope (SEM) images of the cavity when R=0 µm, $m_0$=50 nm, and $\omega$=+1; 10b shows cavity spectrums and far-field distributions of cavity modes of different winding numbers when 2R=50 µm and $m_0$=50 nm, wherein all quality factors of six modes are all between $5 \times 10^3$ and $1 \times 10^4$; c shows a variation relationship between the quality factor Q and resonance wavelength ($\lambda$) of a single vortex cavity ($\omega$=+1) corresponding to the Dirac mass $m_0$ and the vortex size R; and d shows a variation condition of the cavity spectrum over a size of the vortex when $\omega$=+1 and $m_0$=50 nm.

FIG. 10a is scanning electron microscope images of a two-dimensional topological photonic crystal cavity, comprising a top view and a cross-sectional perspective view. FIG. 10b shows measurement results for cavities having different winding numbers ω=+1, 2, 3. The spectrum images in FIG. 10b confirm that the number of topological modes is equal to the value of the winding number and the far-field experimental results of the topological modes are well consistent with the simulation calculation results. The experimental measurement is performed using the cross-polarizing reflectivity measurement setup. Further, in FIG. 10b, the radiation pattern is a horizontally polarized field distribution, and the number of zero-intensity radial lines is equal to the topological charges (in magnitude) of these vector beams.

FIG. 10c shows a variation relationship between the quality factor Q and the wavelength (λ) relative to the maximum Dirac mass ($m_0$) and vortex diameter (2R). In both cases, the quality factor Q increases as the area of the mode field increases, and the area of the mode field increases as the band gap of the Dirac mass decrease and as the vortex diameter increases.

FIG. 10d shows the condition that the spectrums of the two-dimensional topological photonic crystal cavity vary as the vortex diameter varies, and the experimental results are consistent with the simulation calculation results in FIG. 6a. In this embodiment of the present disclosure, when the vortex diameter increases to about 30 μm, the wavelength of the topological mode converges to the Dirac wavelength. High-order modes are also analyzed, and a full spectrum is plotted when 2R=50 μm. Further, the polarization far-field in the case of single mode is measured and the experimental results are well consistent with the simulation calculation results.

Based on the two-dimensional topological photonic crystal cavity provided in the present disclosure, the application of the two-dimensional topological photonic crystal cavity in lasers is further specified, wherein the laser can be a surface emitting laser and has the above-mentioned two-dimensional topological photonic crystal cavity or the two-dimensional topological photonic crystal cavity obtained by the above-described design method.

Figure 11:
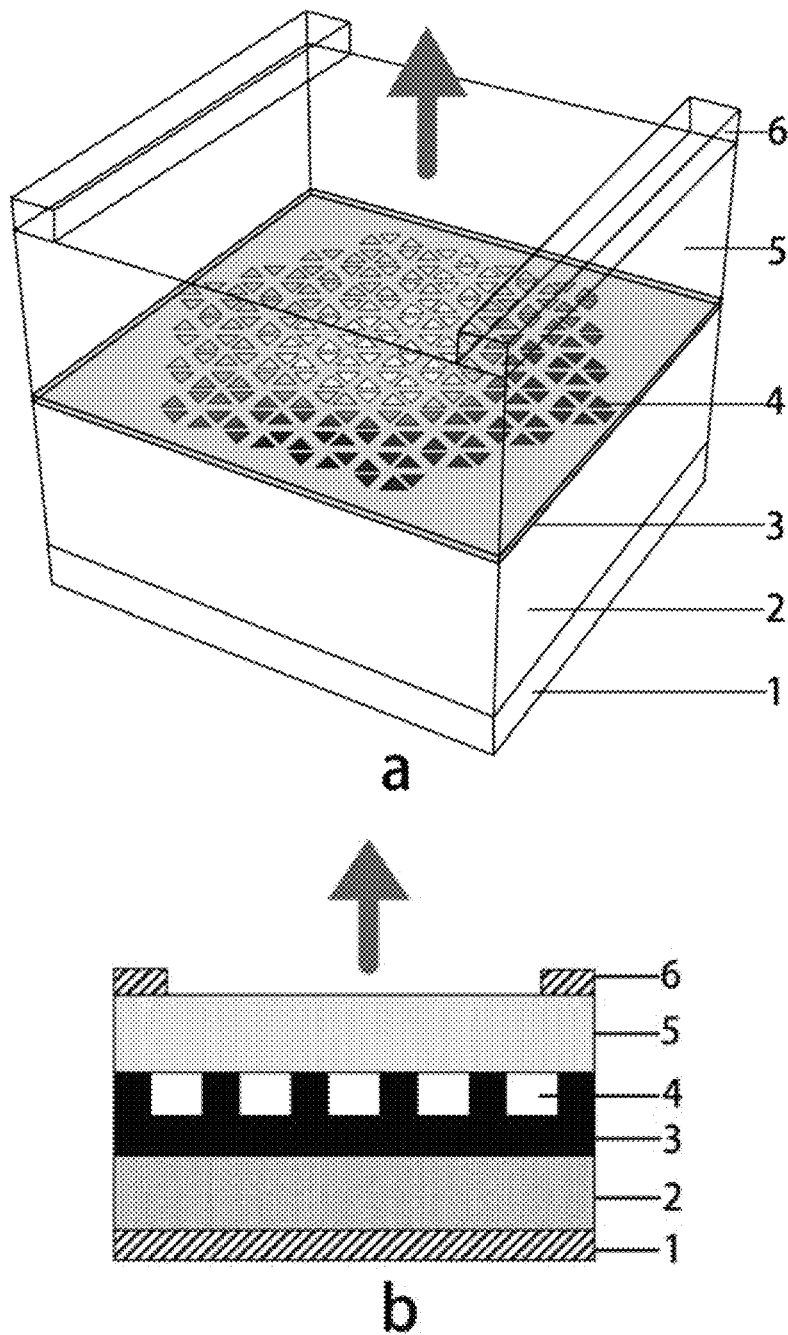

FIG. 11a is a structural schematic diagram of a laser, having the two-dimensional topological photonic crystal cavity, according to an embodiment of the present disclosure, and FIG. 11b is a cross-sectional view of the laser shown in FIG. 11a. The laser comprises a lower electrode 1, a lower substrate layer 2, an active layer 3, a photonic crystal layer 4, an upper substrate layer 5, and an upper electrode 6 successively from the bottom to the top, wherein the photonic crystal layer 4 can be above, below or in the active layer 3. The upper and lower electrodes both are mainly used in charge injection into the active layer, wherein the lower electrode 1 can also reflect the laser energy upward to output the laser light in one direction. The upper and lower substrate layers both comprise a substrate material, a buffer material, and a Distributed Bragg Reflection (DBR) material. The structure provided by the present disclosure is applicable to a material system commonly used in current lasers, such as GaAs, InP, GaN, and the active layer 3 selects a plurality of quantum well or quantum dots for generating a light gain to form a laser output. By filling different dielectric materials (comprising air) in the active layer 3, a spatial arrangement (photonic crystal layer 4) with changed refractive indexes, and the photonic crystal structure shown in FIGS. 11a and 11b are only an arrangement method of the present disclosure. The photonic crystal cavity limits the photon into a cavity with a light gain, and the cavity selectively enlarges the light signal to form laser oscillation, thereby achieving laser output with high performance.

The two-dimensional topological photonic crystal cavity of the present disclosure has characteristics such as a large mode field area, a large free spectral range (FSR), a narrow beam divergence angle, an arbitrary mode degeneracy, and a variety of substrate material compatibility, which are necessary for the high-power single-mode lasers. These advantages can be well applied to the surface emitting lasers to ensure that the lasers can still work stably in single transverse mode and single longitudinal mode under a large area and a high energy output. The calculation results from FIG. 6 confirmed that the two-dimensional topological photonic crystal cavity of the present disclosure has these characteristics.

It will be understood by those skilled in the art that the features described in the various embodiments and/or claims of the present disclosure can perform a variety of combinations or/or incorporations, even if such a combination or incorporation is not explicitly described in the present disclosure. In particular, the features described in the various embodiments and/or claims of the present disclosure may be combined or incorporated in many manners without departing from the spirit and teachings of the present disclosure. All of these combinations and/or incorporations fall into the scope of this disclosure.

The embodiments of the present disclosure are described above. However, these embodiments are for illustrative purposes only, but not to limit the scope of the disclosure. Although various embodiments are described above, this does not mean that the measures in the various embodiments cannot be used in conjunction. The scope of the present disclosure is limited by the appended claims and their equivalents. Those skilled in the art can make a plurality of alternatives and modifications without departing from the scope of this disclosure, which are within the scope of the present disclosure.

The specific embodiments described above further describe the object, technical solutions, and beneficial effects of the present disclosure in further detail, and it should be understood that what are described above are only specific embodiments of the present disclosure and are not used to limit this disclosure. Any modifications, equivalents, improvements within the spirit and principles of the present disclosure should all be contained in the protection scope of the present disclosure.

What is claimed is:

1. A two-dimensional topological photonic crystal cavity comprising a plurality of photonic crystal supercells, wherein:
   the plurality of photonic crystal supercells have a vortex-shaped structural variation around a cavity center of the two-dimensional topological photonic crystal cavity to form a Dirac vortex cavity,
   before the plurality of photonic crystal supercells are modulated to have the vortex-shaped structural variation, the plurality of photonic crystal supercells are at balance positions and energy band structures of the plurality of photonic crystal supercells at the balance positions include Dirac points, wherein the photonic crystal supercells are modulated based on moving one or more types of sublattices in the plurality of photonic crystal supercells, and
   when the plurality of photonic crystal supercells are modulated to have the vortex-shaped structural variation, the Dirac points in the energy band structures of the plurality of photonic crystal supercells are broken to open bandgaps.

2. The two-dimensional topological photonic crystal cavity of claim 1, wherein the plurality of photonic crystal supercells having the vortex-shaped structural variation around the cavity center of the two-dimensional topological photonic crystal cavity comprises:
   one or more types of sublattices in the plurality of photonic crystal supercells being moved and/or rotated coordinatively relative to their respective balance positions, wherein continuous phase rotation from 0 to $2\pi$ of the moved sublattices all can break the Dirac points in the energy band structures when the photonic crystal supercells are at the balance positions.

3. The two-dimensional topological photonic crystal cavity of claim 2, wherein one or more types of sublattices in the plurality of photonic crystal supercells being moved and/or rotated coordinatively relative to their respective balance positions, specifically comprise:
   the cavity center of the two-dimensional topological photonic crystal cavity being at an arbitrary spatial point, and the plurality of photonic crystal supercells having the vortex-shaped structural variation, according to their respective distances and angles relative to the cavity center, in a variation form that one or more types of sublattices in the photonic crystal supercells move displacement vectors relative to their respective balance positions, wherein amplitude and phase of the displacement vectors both are functions of positions of the sublattices relative to the cavity center, the phase of the displacement vectors for respective sublattices has a fixed phase difference, the amplitude of the displacement vectors varies from zero to a maximum amplitude along a radial direction of the cavity, and the phase of the displacement vectors varies continuously or discretely along an angular direction of the cavity with an increment per circle around the cavity center of an integer multiple of $2\pi$ where the integer, being positive or negative, is a winding number.

4. The two-dimensional topological photonic crystal cavity of claim 3, wherein parameters of the vortex-shaped structural variation comprise one or more in a group consisting of a spatial distribution function of the displacement vector, the winding number, the maximum amplitude, size and shape of the cavity, the cavity center position, a material refractive index, a material fill factor, size of the supercell and size of a primitive cell, a working wavelength and frequency of the cavity, shape of the supercell, a number of Dirac points in the energy band structure of the supercell and a position of Dirac points in a Brillouin zone when the supercell is at the balance position, a number and shape of the primitive cells in the supercell, a number and shape of the sublattices in the primitive cell, and a truncation form of the photonic crystal at an edge of the cavity.

5. The two-dimensional topological photonic crystal cavity of claim 4, wherein the supercell is a hexagonal supercell composed of three quadrilateral primitive cells, and each quadrilateral primitive cell comprises two sublattices; when the supercell is at the balance position, a honeycomb lattice is formed and two Dirac points at the edge of the Brillouin zone in the energy band structures of the primitive cell are folded to a center of the Brillouin zone of the supercell to form a double Dirac point; and in the vortex-shaped structural variation, three sublattices of the same type in the supercell are rotated to have a phase difference of 120 degrees and a winding number of positive or negative one.

6. A cavity comprising a plurality of layers of materials with different refractive indexes, wherein:
   any one or more layers of the plurality of layers of materials with different refractive indexes adopt a two-dimensional topological photonic crystal cavity comprising a plurality of photonic crystal supercells,
   the plurality of photonic crystal supercells have a vortex-shaped structural variation around a cavity center of the two-dimensional topological photonic crystal cavity to form a Dirac vortex cavity,
   before the plurality of photonic crystal supercells are modulated to have the vortex-shaped structural variation, the plurality of photonic crystal supercells are at balance positions and energy band structures of the plurality of photonic crystal supercells at the balance positions include Dirac points, wherein the photonic crystal supercells are modulated based on moving one or more types of sublattices in the plurality of photonic crystal supercells, and
   when the plurality of photonic crystal supercells are modulated to have the vortex-shaped structural variation, the Dirac points in the energy band structures of the plurality of photonic crystal supercells are broken to open bandgaps.

7. The cavity of claim 6, wherein the materials with different refractive indexes comprise semiconductor materials, organic materials, air, gases, metals, or insulators, the semiconductor materials comprise any one-elementary or compound material in a III-V group, II-VI group, or IV group, and the any one-elementary or compound material in the III-V group, II-VI group or IV group comprises one or more selected from a group consisting of Si, Ge, GaN, GaP, GaAs, InGaP, InGaAs, AlGaAs, AlGaN, GaAsP, InAs, InAlGaN, InSb, InP, or InGaAsP.

8. A laser having a two-dimensional topological photonic crystal cavity comprising a plurality of photonic crystal supercells, wherein:
the plurality of photonic crystal supercells have a vortex-shaped structural variation around a cavity center of the two-dimensional topological photonic crystal cavity to form a Dirac vortex cavity,
before the plurality of photonic crystal supercells are modulated to have the vortex-shaped structural variation, the plurality of photonic crystal supercells are at balance positions and energy band structures of the plurality of photonic crystal supercells at the balance positions include Dirac points, wherein the photonic crystal supercells are modulated based on moving one or more types of sublattices in the plurality of photonic crystal supercells, and
when the plurality of photonic crystal supercells are modulated to have the vortex-shaped structural variation, the Dirac points in the energy band structures of the plurality of photonic crystal supercells are broken to open bandgaps.

9. The cavity of claim 6, wherein the plurality of photonic crystal supercells having the vortex-shaped structural variation around the cavity center of the two-dimensional topological photonic crystal cavity comprises:
one or more types of sublattices in the plurality of photonic crystal supercells being moved and/or rotated coordinatively relative to their respective balance positions, wherein continuous phase rotation from 0 to $2\pi$ of the moved sublattices all can break the Dirac points in the energy band structures when the photonic crystal supercells are at the balance positions.

10. The cavity of claim 9, wherein one or more types of sublattices in the plurality of photonic crystal supercells being moved and/or rotated coordinatively relative to their respective balance positions, specifically comprise:
the cavity center of the two-dimensional topological photonic crystal cavity being at an arbitrary spatial point, and the plurality of photonic crystal supercells having the vortex-shaped structural variation, according to their respective distances and angles relative to the cavity center, in a variation form that one or more types of sublattices in the photonic crystal supercells move displacement vectors relative to their respective balance positions, wherein amplitude and phase of the displacement vectors both are functions of positions of the sublattices relative to the cavity center, the phase of the displacement vectors for respective sublattices has a fixed phase difference, the amplitude of the displacement vectors varies from zero to a maximum amplitude along a radial direction of the cavity, and the phase of the displacement vectors varies continuously or discretely along an angular direction of the cavity with an increment per circle around the cavity center of an integer multiple of $2\pi$ where the integer, being positive or negative, is a winding number.

11. The cavity of claim 10, wherein parameters of the vortex-shaped structural variation comprise one or more in a group consisting of a spatial distribution function of the displacement vector, the winding number, the maximum amplitude, size and shape of the cavity, the cavity center position, a material refractive index, a material fill factor, size of the supercell and size of a primitive cell, a working wavelength and frequency of the cavity, shape of the supercell, a number of Dirac points in the energy band structure of the supercell and a position of Dirac points in a Brillouin zone when the supercell is at the balance position, a number and shape of the primitive cells in the supercell, a number and shape of the sublattices in the primitive cell, and a truncation form of the photonic crystal at an edge of the cavity.

12. The cavity of claim 11, wherein the supercell is a hexagonal supercell composed of three quadrilateral primitive cells, and each quadrilateral primitive cell comprises two sublattices; when the supercell is at the balance position, a honeycomb lattice is formed and two Dirac points at the edge of the Brillouin zone in the energy band structures of the primitive cell are folded to a center of the Brillouin zone of the supercell to form a double Dirac point; and in the vortex-shaped structural variation, three sublattices of the same type in the supercell are rotated to have a phase difference of 120 degrees and a winding number of positive or negative one.

13. The laser of claim 8, wherein the plurality of photonic crystal supercells having the vortex-shaped structural variation around the cavity center of the two-dimensional topological photonic crystal cavity comprises:
one or more types of sublattices in the plurality of photonic crystal supercells being moved and/or rotated coordinatively relative to their respective balance positions, wherein continuous phase rotation from 0 to $2\pi$ of the moved sublattices all can break the Dirac points in the energy band structures when the photonic crystal supercells are at the balance positions.

14. The laser of claim 13, wherein one or more types of sublattices in the plurality of photonic crystal supercells being moved and/or rotated coordinatively relative to their respective balance positions, specifically comprise:
the cavity center of the two-dimensional topological photonic crystal cavity being at an arbitrary spatial point, and the plurality of photonic crystal supercells having the vortex-shaped structural variation, according to their respective distances and angles relative to the cavity center, in a variation form that one or more types of sublattices in the photonic crystal supercells move displacement vectors relative to their respective balance positions, wherein amplitude and phase of the displacement vectors both are functions of positions of the sublattices relative to the cavity center, the phase of the displacement vectors for respective sublattices has a fixed phase difference, the amplitude of the displacement vectors varies from zero to a maximum amplitude along a radial direction of the cavity, and the phase of the displacement vectors varies continuously or discretely along an angular direction of the cavity with an increment per circle around the cavity center of an integer multiple of $2\pi$ where the integer, being positive or negative, is a winding number.

15. The laser of claim 14, wherein parameters of the vortex-shaped structural variation comprise one or more in a group consisting of a spatial distribution function of the displacement vector, the winding number, the maximum amplitude, size and shape of the cavity, the cavity center position, a material refractive index, a material fill factor, size of the supercell and size of a primitive cell, a working wavelength and frequency of the cavity, shape of the supercell, a number of Dirac points in the energy band structure of the supercell and a position of Dirac points in a Brillouin zone when the supercell is at the balance position, a number and shape of the primitive cells in the supercell, a number and shape of the sublattices in the primitive cell, and a truncation form of the photonic crystal at an edge of the cavity.

16. The laser of claim 15, wherein the supercell is a hexagonal supercell composed of three quadrilateral primitive cells, and each quadrilateral primitive cell comprises two sublattices; when the supercell is at the balance position, a honeycomb lattice is formed and two Dirac points at the edge of the Brillouin zone in the energy band structures of the primitive cell are folded to a center of the Brillouin zone of the supercell to form a double Dirac point; and in the vortex-shaped structural variation, three sublattices of the same type in the supercell are rotated to have a phase difference of 120 degrees and a winding number of positive or negative one.

* * * * *